United States Patent
Dudley et al.

(10) Patent No.: US 11,028,716 B2
(45) Date of Patent: Jun. 8, 2021

(54) LEAF SEAL

(71) Applicants: CROSS MANUFACTURING COMPANY (1938) LIMITED, Bath (GB); CMG TECH LLC, Rexford, NY (US)

(72) Inventors: James Dudley, Rexford, NY (US); Clayton Grondahl, Rexford, NY (US); Aaron Bowsher, Devizes (GB)

(73) Assignees: CROSS MANUFACTURING COMPANY (1938) LIMITED, Bath (GB); CMG TECH LLC, Rexford, NY (US)

( * ) Notice: Subject to any disclaimer, the term of this patent is extended or adjusted under 35 U.S.C. 154(b) by 112 days.

(21) Appl. No.: 16/311,731

(22) PCT Filed: Jun. 23, 2017

(86) PCT No.: PCT/GB2017/051852
§ 371 (c)(1),
(2) Date: Dec. 20, 2018

(87) PCT Pub. No.: WO2017/221032
PCT Pub. Date: Dec. 28, 2017

(65) Prior Publication Data
US 2019/0203607 A1  Jul. 4, 2019

(30) Foreign Application Priority Data

Jun. 24, 2016 (GB) .................................. 1611082

(51) Int. Cl.
*F01D 11/02* (2006.01)
*F16J 15/44* (2006.01)
*F16J 15/3292* (2016.01)
*F01D 11/00* (2006.01)

(52) U.S. Cl.
CPC .......... *F01D 11/025* (2013.01); *F01D 11/001* (2013.01); *F01D 11/02* (2013.01);
(Continued)

(58) Field of Classification Search
CPC ..... F01D 11/02; F01D 11/025; F16J 15/3288; F16J 15/3292; F16J 15/411; F16J 15/442; F16J 15/445; F05D 2240/57
See application file for complete search history.

(56) References Cited

U.S. PATENT DOCUMENTS 4,998,739 A * 3/1991 Weiler .................. F01D 11/025
277/422
5,632,493 A * 5/1997 Gardner ................... F16J 15/48
277/411
(Continued)

FOREIGN PATENT DOCUMENTS

| EP | 0745795 A1 | 12/1996 |
| WO | WO2011156808 A1 | 12/2011 |
| WO | WO2014022290 A1 | 2/2014 |

*Primary Examiner* — Nicholas L Foster
(74) *Attorney, Agent, or Firm* — King & Schickli, PLLC (57) ABSTRACT

A leaf seal assembly 10' is disclosed for use in a gap between a rotating component 1 and a stationary component 2, for example of a turbo-machine. The leaf seal assembly 10 comprises at least one leaf seal 20' having a generally planar surface. A runner 50' is coupled to a distal end of the least one leaf seal 20'. The at least one leaf seal 20' maintains the runner 50' in a first position away from the rotating component 1 in an unpressurised inoperative state. The runner 50' moves to a second position, close to, but not contacting, the rotating component 1 in a pressurised operative state. In some embodiments the at least one leaf seal is angled in the direction of the flow. In some embodiments a first leaf seal is vented. In some embodiments the leaf seal assembly is segmented. In some embodiments the runner comprises segments having a radial thickness which varies circumferentially.

15 Claims, 9 Drawing Sheets

(52) U.S. Cl.
CPC ......... *F16J 15/3292* (2013.01); *F16J 15/442* (2013.01); *F05D 2240/57* (2013.01); *F16J 15/445* (2013.01)

(56) References Cited

U.S. PATENT DOCUMENTS

| | | | | |
|---|---|---|---|---|
| 6,811,154 | B2 * | 11/2004 | Proctor | F16J 15/164 |
| | | | | 277/355 |
| 7,216,871 | B1 * | 5/2007 | Datta | F01D 11/02 |
| | | | | 277/411 |
| 7,320,468 | B2 * | 1/2008 | Morgan | F01D 11/001 |
| | | | | 277/400 |
| 7,410,173 | B2 * | 8/2008 | Justak | F01D 11/00 |
| | | | | 277/355 |
| 8,474,827 | B2 * | 7/2013 | Grondahl | F01D 11/02 |
| | | | | 277/411 |
| 9,033,657 | B2 * | 5/2015 | Gibson | F16J 15/164 |
| | | | | 415/231 |
| 9,255,642 | B2 * | 2/2016 | Bidkar | F01D 11/04 |
| 9,587,746 | B2 * | 3/2017 | Bidkar | F16J 15/442 |
| 2007/0120327 | A1 * | 5/2007 | Justak | F01D 11/00 |
| | | | | 277/355 |
| 2011/0304101 | A1 * | 12/2011 | Grondahl | F16J 15/445 |
| | | | | 277/411 |
| 2014/0008871 | A1 * | 1/2014 | Bidkar | F04D 29/164 |
| | | | | 277/303 |
| 2014/0062024 | A1 * | 3/2014 | Bidkar | F16J 15/442 |
| | | | | 277/303 |
| 2014/0119912 | A1 * | 5/2014 | Bidkar | F16J 15/442 |
| | | | | 415/229 |

\* cited by examiner

Figure. 1

PRIOR ART

LEAF SEAL

TECHNICAL FIELD

The present invention relates to a seal for a rotating shaft, for example rotating parts of turbomachinery (for example the shaft of a gas turbine). In particular, the invention relates to a leaf seal assembly which utilises a plurality of leaf members to seal a rotating member.

BACKGROUND

A pressure actuated leaf seal assembly has been proposed in International Patent Application WO2011/156808 (Corresponding to published US Patent Application US2011/3034101). The seal comprises film riding, hydrodynamic/hydrostatic runners under seal member leaf ends. Leaf seal assemblies according to embodiments of this disclosure maintain the runner away from a rotating body until adequate rotating speed and rotating pressure is present to generate lift required to allow the runner to float on a thin film of operating fluid on the rotating body, so that the runner does not rub the rotating body. In addition, runners are attached, or added, to leaf seal members such that the runners move in a radial direction, while remaining substantially parallel to the rotating body. In one embodiment, a runner can comprise a separate structure coupled to a leaf seal member, and in another embodiment, a runner can comprise a wear-resistant pad on a distal end of a leaf seal member. Once operational conditions are reached, pressure acts upon the seal assembly to urge the runner towards the sealing surface until the pressures balance and the runner is able to float with a small clearance gap on a film between the runner and the surface. Thus, a seal of the type referred to in WO2011/156808 may be considered to be a "Film Riding Pressure Activated Leaf Seal".

SUMMARY

The power generation expectation for turbine efficiency, service intervals and life continues to rise in order to meet stringent future targets. Sealing the gap between rotating and non-rotating parts, while accommodating the thermal growth, misalignment and rotor dynamics, is a key need. Contacting seals show deterioration in sealing efficiency over time. As such it has been recognised that there may be potential advantages in providing arrangements which enable the use of film riding, non contact seals.

The applicants have carried out initial test analysis for the Film Riding Pressure Activated Leaf Seal ("FRPALS") for proof of concept. Such a Testing has been completed using a custom designed test rig with large scale, 2-dimensional, linear sealing segments. The pressure profile and gap under the runner is examined and reported with comparison to theoretical performance at the design cold clearance of 0.120". Further testing was conducted with cold build clearances either side of the design point for wider understanding of the activation behaviour.

Shaft sealing is essential for efficiency and performance in turbomachinery. The expectation of the industry for longer service intervals and reduced degradation of power output due to wearing parts has led to advancements in non-contacting and compliant sealing technology. Reduced efficiency due to shaft sealing over the life of a turbine is a result of multiple variations such as thermal distortion, misalignment, manufacturing tolerances and transient excursions.

Although contacting, compliant seals, such as brush seals, are proven technology with effective running of up to 100,000 hours in certain applications. They are not appropriate for all locations within a turbine and can be susceptible to wear due to large radial rotor-stator excursions. While traditional non-contacting solutions, such as labyrinth teeth, are designed with large radial clearances resulting in potentially high leakage at steady state operating conditions.

Non-contacting compliant seals (for example such as those disclosed in U.S. Pat. Nos. 8,474,827; 8,172,232; and 9,359,908) rely on a balance of forces within their specific design to move radially during transient conditions maintaining a sufficient clearance between the rotor and seal without contact for the range of conditions within the application.

Figure 1:
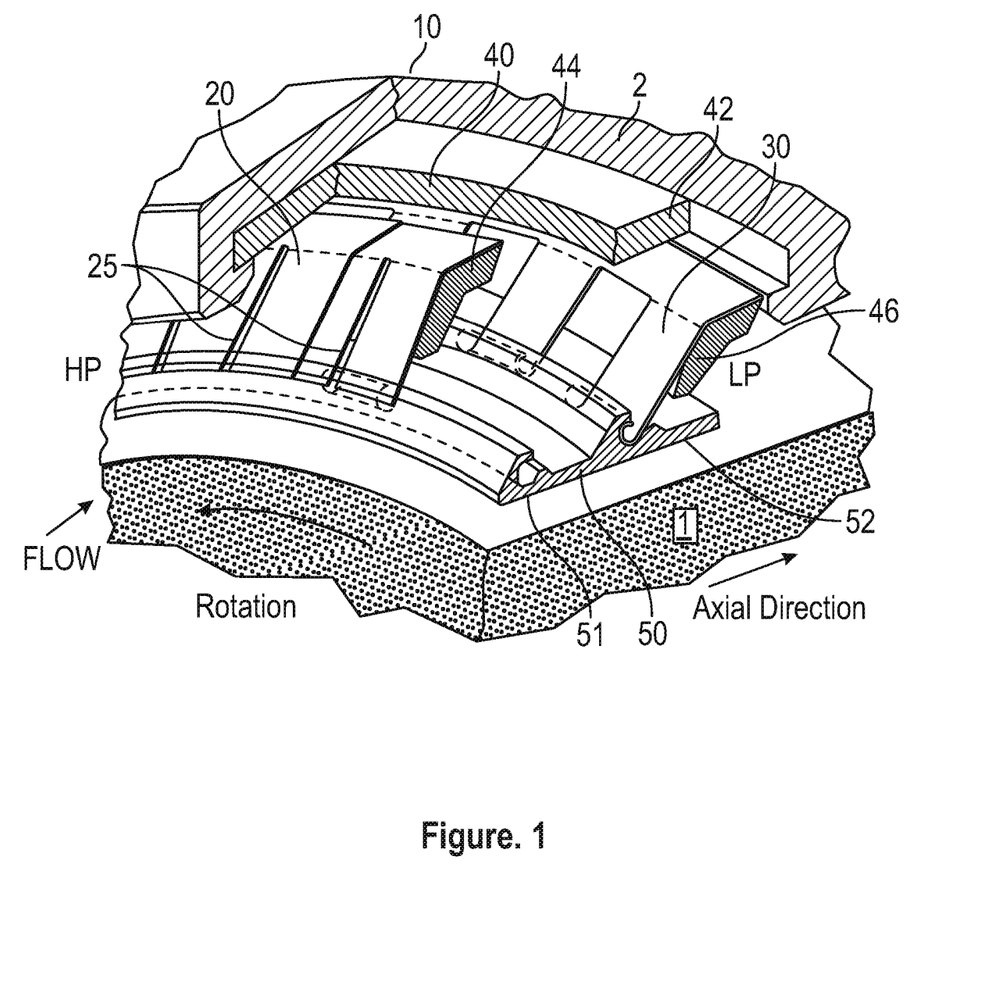
FIG. 1 provides schematic three dimensional partial cross-section of an example of a film riding pressure activated leaf seal assembly (generally of the type disclosed in WO2011/156808)

Advancing from the Pressure Activated Leaf Seal ("PALS") concept, the evolution to the FRPALS was first introduced in 2010 (and is shown in FIG. 1). This hydrostatic compliant seal uses the PALS concept of deflecting leaves that actuate under pressure loading to close down to the rotor under the desired operating conditions, while maintaining a large clearance at start/stop conditions. The concept is made up of several components that are designed to work under conditions required to meet application requirements. Initially the seal has a relatively large radial clearance to the runner in cold conditions. As a pressure drop is applied across the seal, the force acting on the leaf elements results in a radial closure towards the rotor, until the balanced film forces under the runner generated by the Rayleigh step result in the film riding seal. The leaves and runners are designed to ensure the seal closure can accommodate start/stop conditions of the turbine as well as operate with a small clearance to the shaft at base load conditions. The seal is generally designed to avoid contact with the shaft in the turbines predicted operating cycle.

The applicants have proposed a FRPALS design of reverse orientation, in that the leaves are angled in the direction of flow (FIG. 24). The applicants have identified that this novel arrangement may result in a more compact design, offering the seal to a wider range of applications.

Accordingly, embodiments of the invention may provide a leaf seal assembly for use in a gap between a rotating component and a stationary component the leaf seal assembly comprising:
   at least one leaf seal having a generally planar surface; and
   a runner coupled to a distal end of at least one leaf seal
      wherein the at least one leaf seal maintains the runner in a first position away from the rotating component in an unpressurized inoperative state and moves the runner to a second position, close to, but not contacting, the rotating component in a pressurized operative state and wherein
   the at least one leaf seal being angled in the direction of the flow.

The leaf seal assembly may be for use between the rotating and stationary components of a turbo-machine, such as a gas turbine.

The at least one leaf seal may include at least one set of leaf seal members. For example the leaf seal may comprise a plurality of leaf seal members.

When discussing the direction/alignment of the leaf seal the skilled person would appreciate that (unless otherwise stated) this is generally intended to refer to the plane of the generally planar seal surface when viewed in a radial cross-section extending along the axial direction of the seal assembly or turbo-machine. When viewed in transverse cross section, the leaf seal members will be substantially annular in profile.

It will be appreciated that the seal assembly is generally aligned with the rotating components in use. As such, references to the axial direction of the seal would correspond to a direction which when assembled/in use is substantially parallel to the axis of the rotating components (i.e. the axial direction of the turbo-machine component in which the seal is being used). Likewise, the radial direction will be understood to correspond to a direction which when assembled/in use is substantially parallel to a radial direction of the rotating components (and therefore generally perpendicular to the axial direction).

The flow direction is from the high pressure to the low pressure side of the seal. Thus, embodiments of the invention alternatively be understood to mean that the at least one leaf seal is inclined such that it extends axially rearwardly towards the low pressure side of the seal. In other words, the distal (or free) end of the leaf seal may be axially downstream of the proximal (or supported) end.

The gap between the rotating component and the stationary component may be a substantially annular gap surrounding one of the components.

The at least one leaf seal may for example be angled rearwardly relative to the axial direction of the turbomachine. The flow direction will generally be understood to be substantially aligned with the axial direction of the turbomachine.

It will be appreciated that the at least one leaf seal extends from one radial side of the gap (proximal to the stationary component) towards the other side of the gap (proximal to the rotating component). Thus, the inclined leaf seal of the invention extends radially from the support surface in a direction which is non-perpendicular to axial direction of the components and which is inclined in the direction of the flow. The distal end is generally radially inward of the proximal end (since it projects across the gap); however it will be appreciated that this could be reversed in some arrangements.

It will be appreciated that this arrangement is directly inverted relative to the normal configuration of a leaf seal. In known configurations (such as those shown in WO2011/156808) the leaf seal is inclined forwardly from its support/base into the flow direction. This means that the forward ends of the leaf seals are axially forward of the support and the planar surface of the leaf is inclined towards the high pressure side.

The applicants have found that a reversed seal arrangement in accordance with embodiments of the invention are unexpectedly effective and may be utilised to provide a more compact arrangement. This may result in a seal which can be used for a wider range of applications.

According to a further aspect of the invention, there is provided a leaf seal assembly for use in a gap between a rotating component and a stationary component, the leaf seal assembly comprising:

a first leaf seal having a generally planar surface; and a second leaf seal, spaced apart along an axial direction of the gap from the first leaf seal, the second leaf seal having a generally planar surface a runner coupled to a distal end of the first and second leaf seals wherein the leaf seals maintain the runner in a first position away from the rotating component in an unpressurized inoperative state and moves the runner to a second position, close to, but not contacting, the rotating component in a pressurised operative state and wherein a cavity is defined by the first leaf seal, second leaf seal and runner and wherein the first leaf seal is vented such that the cavity is pressurised when the rotating component is in the pressurised operative state.

The first leaf seal may be the high pressure side of the seal assembly (and the second leaf seal may be the low pressure side of the leaf seal assembly). Thus, the cavity may be vented to the high pressure side of the seal assembly in the operative state.

The applicants have found that pressurising the cavity with the high pressure, upstream, fluid helps to urge the runner radially towards its second operational position (i.e. the position in which it is close to the rotating component and will adopt a "film riding" condition).

The cavity may be further bounded by a support of the seal assembly. As such, the cavity may be an at least partially annular space bounded radially by the opposing surfaces of the support and runner and axially by the first and second leaf seals. The support may be generally parallel to and radially spaced apart from the runner.

The first leaf assembly may be vented to the high pressure side of the seal assembly by a number of ways. The first leaf seal may include one or more apertures (for example at least one of a hole, slot and/or castellation) which extend through the full axial thickness of the first leaf seal. The skilled person will appreciate that existing pressure activated leaf seals may include radial slots extending from an edge to allow the planar seal to adopt the required geometry of the sealing space (which may typically be annular), however such slots are not intended to provide a ventilated seal—typically the or each leaf seal will comprise multiple leaf seal members with their slots misaligned to prevent flow through the seal.

The leaf seal assembly may be formed of a number arcuate segments. The arcuate segments may each provide a part-circumferential section of the seal and are assembled to provide a substantially annular seal arrangement. As will be appreciated (from other compliant seal arrangements) segmented seals may provide advantages for manufacturing and installation.

In embodiments of the invention the leaf seal assembly may be segmented and venting of the first leaf seal may be conveniently provided by providing a clearance gap between the leaf seals of adjacent segments. For example, the first leaf seal sections of each segment may have a reduced actuate length relative to the second leaf seals sections of each segment. The end sections of each segment of the first leaf seal may, for example, be relieved. Thus, when the segments of the leaf seal assembly are assembled the first leaf seal will be provided with a series of circumferentially spaced apart opening at the segment joints. In contrast, the second leaf seal would not be relieved and would provide a continuous/uninterrupted circumferential seal when the segments are assembled.

The runner may include a sealing surface. The sealing surface may substantially correspond in profile to the shape of the rotating component. For example the sealing surface may be circumferentially surround the rotating component. The runner, and therefore the sealing surface, may typically be segmented such that each segment of the sealing surface is an arcuate section generally corresponding to the form of the rotating component.

The sealing surface of the runner may be provided with at least one flow control feature, for example three dimensional features formed in/on the face of the sealing surface. For example, the sealing surface may be provided with at least one flow control feature to optimise the film formed between the rotating body and runner during the operative state. For example the flow control features may be arranged to increase the film thickness. Such features may improve the higher pressure capability of the seal assembly.

The flow control features may for example comprise at least one rib or slot formed in the sealing surface. A plurality of slots or ribs may be spaced circumferentially around the sealing surface. The, or each, slot or rib may extend along a length of the sealing surface in the axial direction of the seal assembly. The, or each, slot or rib may be inclined relative to the axial direction, it may therefore extends for example in both an axial and a circumferential direction. The, or each, slot or rib may be substantially linear. Providing a series of slots or ribs on the sealing surface in accordance with embodiments of the invention may increase film stiffness to help counteract the forces acting on the upper side of the runner (which urge the runner towards the rotating component in the operative state). The flow control features may also help to reduce edge losses at the joins between separate segments of the seal assembly (it will be appreciated that whilst losses at such joins may be minimised the seal must move during use and will be subject to manufacturing tolerances so small gaps between segments cannot be entirely avoided).

According to a further aspect of the invention, there is provided a segmented leaf seal assembly for use in a gap between a rotating component and a stationary component, the leaf seal assembly comprising
  a plurality of arcuate segments each segment comprising:
    at least one leaf seal segment having a generally planar surface;
    a support segment coupled to a proximal end of the at least one leaf seal for fixedly connecting the leaf seal assembly to the stationary component;
    a runner segment coupled to a distal end of the at least one leaf seal segment wherein the at least one leaf seal segment maintains the runner in a first position away from the rotating component in an unpressurised inoperative state and moves the runner to a second position, close to, but not contacting, the rotating component in a pressurised operative state; wherein
    and wherein the runner segment is provided with a radial thickness which varies circumferentially.

It will be appreciated that the plurality of arcuate segments may be assembled provide a complete annular seal. Accordingly, the leaf seal segment, support segment and runner segment of the plurality of arcuate segments may each form a corresponding complete component of the seal assembly.

The runner segment may have a minimum radial thickness at the centre of the runner segment and a maximum radial thickness at the outer regions of the runner segment.

Accordingly, the runner segment may have an arcuate sealing surface on the rotor side and a substantially linear surface at the interface with the leaf seal.

The support segment may have a radial thickness which varies circumferentially. The support segment may have a maximum radial thickness at the centre of the segment and a minimum radial thickness at the outer regions of the segment. As such, the support segment may have an arcuate outer surface on the stator side (which may for example be arranged to engage/interface with a backing ring) and a substantially linear surface at the interface with the leaf seal.

Thus, it will be appreciated that the segmented seal in accordance with embodiments enables may comprise a plurality of leaf seal segments acting between substantially parallel spaced apart linear surfaces of the runner segment and support segment.

The complete segmented seal assembly still provides an annular arrangement which can seal between a rotating and stationary member with the inner surface of the runner segments and outer surface of the support defining circular circumferential boundaries of the seal. The leaf seal may comprise a series of generally tangentially aligned extending members defining a polygonal leaf seal.

Whilst the invention has been described above, it extends to any inventive combination of the features set out above, or in the following description or drawings.

BRIEF DESCRIPTION OF THE DRAWING FIGURES

The invention may be performed in various ways, and embodiments thereof will now be described by way of example only, reference being made to the accompanying drawings, in which.

DETAILED DESCRIPTION OF THE INVENTION

FIG. 1 provides an example of a film riding pressure activated leaf seal assembly 10 (generally of the type disclosed in WO2011/156808). The leaf seal assembly 10 is arranged to seal an annular gap extending between a rotating component 1 and a stationary component 2 of a turbomachine (for example a gas turbine). The leaf seal assembly 10 defines a barrier between a first high pressure side HP and a second low pressure side LP. The high pressure side HP is upstream of the low pressure side and the flow direction of fluid as seen in FIG. 1 is substantially from left to right (and along the axial direction of the seal assembly).

The leaf seal assembly includes a first leaf seal 20 including at least one set of leaf seal members. Each leaf seal member is generally planar and provides a planar surface facing the flow direction. For clarity purposes FIG. 1 shows only a single layer of leaf seal members in the leaf seal 20. However, the skilled person would appreciate that the leaf seal 20 would, in fact, be formed of a plurality of layered leaf seal members. Each leaf seal member includes a number of slots or cut-outs 25 to allow the leaf seal 20 to adopt the required geometry. It will be appreciated that the slots or cut-outs 25 would (as described in more detail in WO2011/156808) be misaligned from one another when the adjacent leaf seal members are built up into a leaf seal 20 so that the leaf seal will block fluid flow through the slots or cut-outs 25.

A second leaf seal 30 is provided spaced apart along an axial direction from the first leaf seal 20. Like the first leaf seal 30, for clarity only a single leaf seal member is shown in FIG. 1 but the skilled person would understand that typically the second leaf seal 30 may include a number of layered leaf seal members.

The seal assembly 10 further comprises a support arrangement 40 for supporting and aligning the seal assembly 10 within the turbo-machine. Such support assemblies will be known to the skilled person from other forms of compliant seal (for example brush seals and non-film riding leaf seals) and as such the detailed construction of the support arrangement 40 will not be discussed herein. The support assembly may generally include a backing ring 42 which is used to attach the seal assembly 10 to the stator 2 of the turbo-machine (for example being received into a keyed recess and welded in place). The support assembly 40 may also include leaf seal support elements or backing plates 44 and 46. The backing plates 44, 46 may both support and align their respective leaf seals 20, 30.

The film riding pressure activated leaf seal (FRPALS) is primarily distinguished from a standard leaf seal by the provision of a runner 50 coupled to a distal end of at least one leaf seal 20/30. In the illustrated example the runner 50 is coupled to both the first 20 and second 30 leaf seal. As explained in further detail in WO2011/156808, the leaf seals 20, 30 are arranged to maintain the runner in a first position away from the rotating component in an unpressurized inoperative state. When the turbo machine is operational the pressure difference generated across the seal 10 moves the runner 50 towards the rotor 1. As operational pressure is reached a thin film of operating fluid develops between the rotor 1 and the sealing surface 52 of the runner 50. It may be noted that forward of the sealing surface 52 the runner may include a "Rayleigh step" or "Rayleigh pad" 51—such configurations are well known in the art and may optimise load capacity in a slider bearing/seal arrangement.

The development of a thin film generates lift to ensure that the runner is in a second position, close to, but not contacting, the rotor 1. This arrangement advantageously ensures that the seal 10 is kept away from the rotor until operation pressures are reached and maintains a sealing clearance which avoids contact with the rotor 1 under both normal and transient operating conditions (for example eccentric transient excursions which might occur during normal operation of a turbo machine).

Testing has been performed to validate the effects of FRPALS arrangements and will now be described by way of example only. A combination of computational analysis (computational fluid dynamics and finite element analysis) and physical testing was carried out.

Multiple tests were undertaken to optimize runner geometry (for example the Rayleigh step including axial step length, radial step height, radial gap and the ratio of step length to overall runner length) and was achieved by creating runner blocks segments of desired geometry for each test. Runner pressure profile data was recorded and processed to resolve runner force and center of pressure as a function of runner clearance for use in the analytical design in the next section. Runner geometry for the full scale proof of concept was based on these physical bench test results. The film force characteristics from the bench tests were used in the Finite Element Modeling ("FEM") model and the very good agreement between the performance predicted by the FEM model and the performance observed in tests provides confirmation that the bench test results were accurate.

For the analytical analysis specifications for a typical application were established at the beginning of a design process including how much rotor eccentricity the seal is required to accommodate. This could be due to thermal distortion of the stator moving the seal relative to the centerline of the bearings, seal misalignment and run-out, or rotor radial motion within the bearings. These specifications established how much the runners may need to travel radially while preserving a positive clearance with the rotor.

Figure 4:
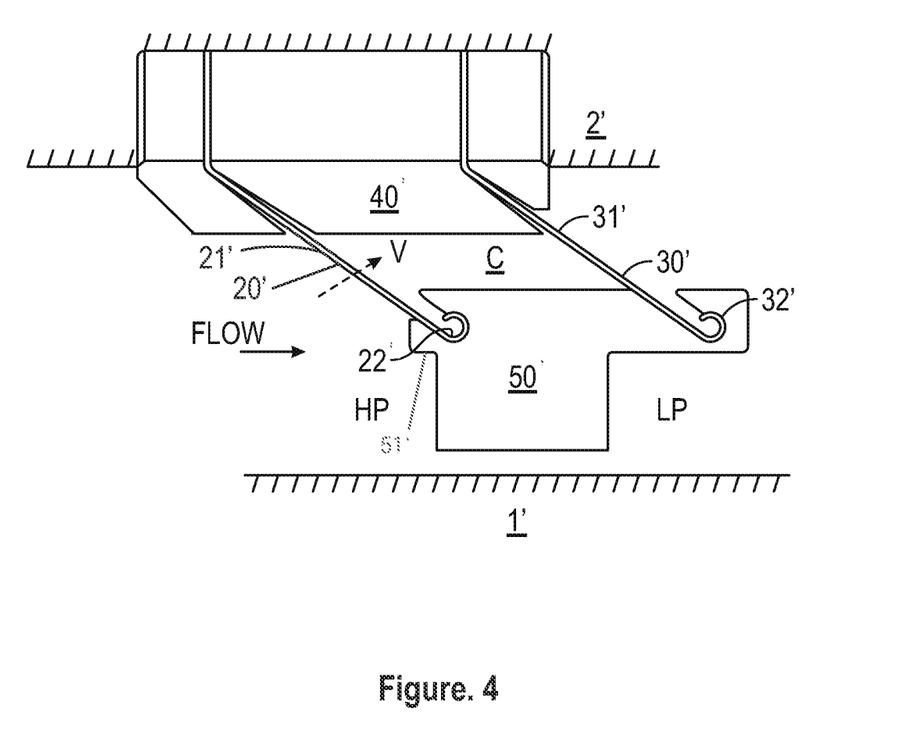
FIG. 4 shows a cross section of a leaf seal in accordance with the embodiment of FIG. 3.

The working pressure both upstream and downstream of the seal must be specified as well as the fluid temperature and viscosity. A new design started with an estimation of each seal parameter based on experience from designing other FRPALS for similar applications. If the runner configuration is expected to be different from prior experience detailed CFD modeling and/or testing is needed to establish the film force characteristics for that runner configuration. FEM then used the film force data from the CFD or bench testing to determine how closely that version fulfilled the specifications. Systematic variation of parameters and new FEM analyses were used to refine the concept design that fulfills all the desired specifications and gave the smallest clearance between the seal runner and the rotor at the nominal operating conditions to provide the lowest leakage (FIG. 4).

Plotting clearance between the runner and the rotor for a range of runner eccentricity was helpful in comparing the performance of seal designs during the systematic variation of parameters to determine the best design. To obtain such a plot, the FEM analysis was not just a single point analysis, but the radial distance between the rotor and the seal housing was varied smoothly in a transient analysis while holding the upstream and downstream pressures constant at specified values. This gave a good view of how the seal behaved and supported selecting a set of design parameters to meet all requirements and maintain a minimum leakage (tightest runner/rotor clearance) at nominal operating conditions while avoiding a rotor rub at maximum eccentricity. Typical design parameters varied in this process were the seal leaf length, seal leaf thickness, knee angle of the leaf (angle between the leaf as assembled and a line parallel with the axis of the rotor), radius of curvature of the support which the leaf wraps around as pressure is applied, distance axially between the two sets of leaves supporting the runner, runner axial length and axial distance to the step.

To provide a large application scale static testing a custom test rig was utilised. Segments were mounted to a vertically adjustable top plate to investigate the effects of build eccentricity. Finally a static base plate was instrumented with fourteen static pressure transducers and four proximity probes to record the pressure distribution as the flow passed under the central runner and monitor the gap to ensure complete film riding. A viewing window was utilized to capture images of the closing event using high speed photography. The FRPALS segments were designed using a combination of bench test results and analytical approach to have the following geometry (which it will be appreciated is provided by way of reference only—the skilled person will appreciate that the methods described herein could be used to provide a suitable geometry for particular requirements):

Runner axial length—1.500" [38.1 mm]
    Rayleigh step height—0.010" [0.25 mm]
    Rayleigh step axial distance—0.600" [15.24 mm]
    Leaf thickness—0.028" [0.71 mm]
    Leaf length—2.375" [60.33 mm]
    Leaf angle—52 degrees [0.908 rad]
    Radius of curvature of the support—6.600" [167.64 mm]

Proximity probes were used to monitor the film gap once the leaves had closed and compare each corner for tilt and rock. Static pressure transducers were also used to measure the static pressure at locations spanning the full length of the runner including the clearance step, Rayleigh step and the film riding area.

The test procedure began by setting the radial distance between the runner at cold conditions and the base plate to 0.120" [3.05 mm]. This is the optimum design condition calculated using the analytical approach for this design and is referred to as 0 eccentricity. Pressure was then applied at a constant rate until the leaf/runner assembly closed down to the base plate, i.e. 'rotor'. The pressure was varied in increments of 5 psi [0.3 bar] to a maximum upstream pressure of 50 psig [3.5 bar] before decreasing the pressure and averaging the data at each pressure point. This procedure was repeated for a range of eccentricities from the intended design point by increasing or decreasing the radial distance between the runner and base plate at cold conditions.

The results of the testing will now be discussed in further detail. The initial test at the design clearance of 0.120" [3.05 mm] or 0 eccentricity highlighted stable operation of the leaves. The closure event did not show any signs of instability and the seal remained stable throughout the duration of testing.

The proximity probes captured the final stages of the closure event before reliable film riding was achieved at approximately 20 psig [1.4 barg] upstream pressure and maintaining a constant gap between 0.005-0.010" [0.13-0.25 mm] up to 50 psig [3.5 barg] with little hysteresis when removing the pressure. The full closure event was not captured as the cold build clearance was outside the range of the proximity probes and low speed data logging was in operation for prolonged testing.

The pressure distribution showed a generally linear relationship of the pressure under the runner at each location relative to the upstream pressure. The pressures under the clearance step were seen to be very similar in value. The pressures under the Rayleigh step were lower than that of the clearance step, but again are similar in value to each other. The pressures under the film riding surface were seen to be decreasing non-linearly with axial length. The pressure distribution from front to back was found to show a negligible drop in pressure from the upstream pressure to the clearance step. A drop of approximately 2 psi [0.14 bar] was seen at the Rayleigh step at 40 psi [2.76 bar] upstream pressure. The pressure distribution across the axial length of the Rayleigh step remained constant with equal values in pressure along the length. At the step from the Rayleigh step to the film riding surface, a larger pressure drop was seen of approximately 5 psi [0.34 bar] at 40 spi [2.76 bar] upstream pressure. The pressure across the axial length of the film riding surface is of non-linear distribution to a downstream pressure of atmospheric conditions.

Supplementary to the pressure sweep at the design clearance of 0.120" [3.05 mm], the eccentricity was also examined. The analytical design, described above, predicted the average clearance of the runner at a range of eccentricity values for an upstream pressure of 40 psig [2.76 barg]. The test results were plotted with the analytical results and showed a good correlation, validating CFD and FEM models. Full pressure sweeps were undertaken at all eccentricities during the testing and upstream pressures below 20 psig [1.38 barg] do not follow the trend of those above this value due the seal being in the process of closure at these pressures and obscuring the results. The results for 20-50 psig [1.38-3.45 barg] were similar in value for eccentricities from the design point to greater clearances. However, for greater interferences the gap increased with pressure with a total increase in gap from 20-50 psig [1.38-3.45 barg] of approximately 0.005" [0.13 mm].

The analytical design process took into consideration the tilt of the runner from front to back and offered the optimum design for testing. This tilt was monitored throughout the testing using the proximity probes.

An average angle of tilt over the range of pressures and eccentricities was examined in this test program. The maximum angle of tilt was up to 0.16 degrees at an eccentricity of 0.060" [1.52 mm] and an upstream pressure of 50 psig [3.79 barg]. The values for tilt throughout the testing remained positive indicating that the rear edge of the runner is lower than the front edge. The tilt appears to be dependent on both eccentricity and pressure with a convergence of angle at between 0-0.02" [0-0.51 mm] eccentricity and a decreasing angle with pressure for 0 eccentricity.

The rock of the runner was also examined in the testing, where rock was the average angle of the runner from left to right. The results found a maximum angle of no more than 0.07 degrees. The results were inconclusive to determine if eccentricity or pressure is a direct cause of rock.

Finally an attempt was made to manually excite the seal and investigate the effects of resonance. A 0.050" [1.27 mm] shim was placed under the runner. A Pressure of 25 psi was applied to insure the runner had fully closed to the shim. The shim was then quickly removed from under the runner and high speed data acquisition was used to log the gap from the proximity probes in conjunction with high speed photography to capture the effects. The test failed to destabilize the seal and within 11 oscillations at approximately 83 Hz, the seal had stabilized back to the film riding condition.

The skilled person will appreciate that bench testing, analytical modeling and large application scale testing have all combined to prove the concept of the FRPALS. A design process has been developed that uses quick bench testing to validate analytical models used to acquire the optimum geometry for a sealing specification. This method along with the film riding concept has been validated against using large scale rig test data.

It will also be appreciated that the FRPALS proved to be effective in a range of conditions and not only worked well at the design point, but showed capability to perform effectively at various eccentricities and over a wide range of pressure. The testing to date has not shown any signs of resonance or stability issues, but further investigation into these areas is planned for the future In accordance with an embodiment of the invention the applicants have now proposed a modified FRPALS arrangement which is of a "reverse" orientation. As shown schematically in FIG. 2, the reverse arrangement utilises a runner 50' which is mounted on leaf seals 20' and 30' which are angled in the direction of flow. The applicants have identified that this novel arrangement may result in a more compact design, offering the seal to a wider range of applications.

Figure 2:
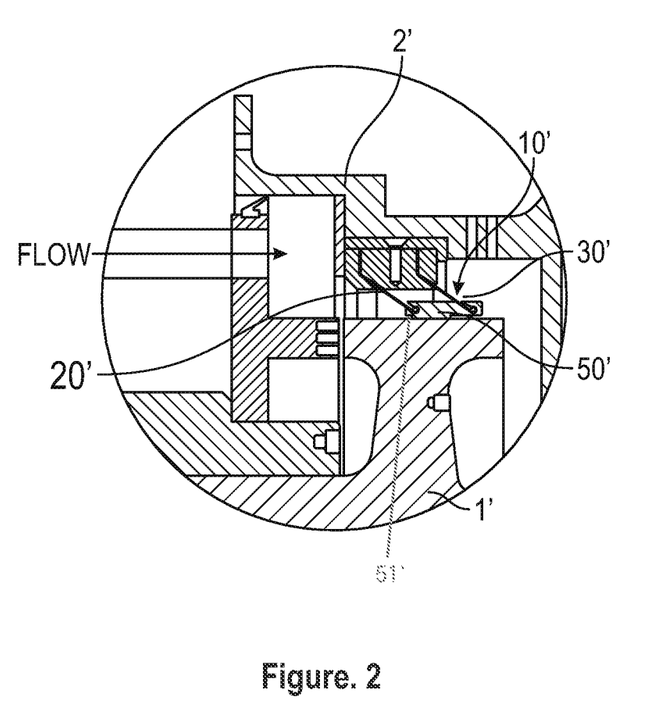
FIG. 2 shows a schematic cross sectional view of a reversed film riding film riding pressure activated leaf seal assembly in accordance with an embodiment.

As shown in FIGS. 2 and 4 the flow direction extends from the left to right. The leaf seal assembly 10' includes a support 40' connected to the stator 2'. A first leaf seal 20' at the high pressure side and a second seal 30' at the low pressure side. The runner 50' includes a Rayleigh step 51'. The runner 50' is connected to the distal ends of the leaf seals 20', 30' proximal to the rotor 1'. It will be seen that the leaf seals 20' and 30' are angled in the direction of the flow. The leaf seals extend across the gap between the stator 2 and rotor 1 from a proximal end 21' and 31' which is fixed at the support 40' (so proximal to the stator 2') to a distal/free end 22' and 32' (which is proximal to the rotor 1'). The distal ends 22' and 32' support the runner 50'. It will be appreciated that in this reversed arrangement the leaf seal members of each leaf seal 20', 30' are inclined such that they extend axially rearwardly towards the low pressure side of the seal. As such the distal ends 22' and 32' of the leaf seal 20' and 30' pressure seal are be axially downstream of the proximal ends 21' and 31'.

Figure 3:
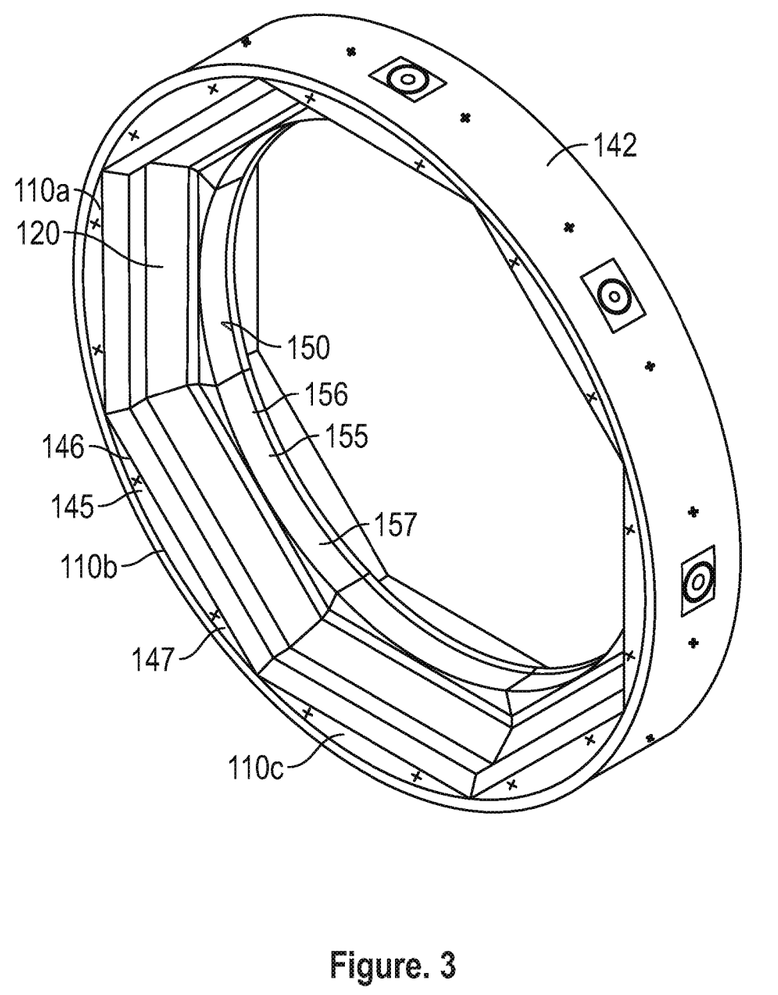
FIG. 3 shows a segmented leaf seal assembly according to an embodiment.

As shown in FIG. 3 a leaf seal in accordance with embodiments of the invention may typically be an annular seal. The leaf seal may, therefore, be formed from a number of segments 110a, 110b, 110c etc. Each segment 110 is generally arcuate and provides a part circumferential section of the full annular leaf seal. Each segment 110 may include a runner 150 and leaf seal 120 as described above. When assembled the segments may include a continuous backing ring 142.

In addition to the ease of manufacture and/or assembly it may be noted that a further advantage of a segmented seal is that the runner 150 and support 140 of each segment may be arranged to simplify the geometry of the seal assembly. In the prior art arrangement of FIG. 1, the leaf seal 20, 30 has a complex slotted geometry and the runner 50 is a generally thin profiled member which extends parallel to the surface of the rotor 1 (i.e. it is annular or part-annular in profile). In contrast in the segmented arrangement according to embodiments of the invention the runner 150 is provided with a radial thickness which varies circumferentially (this may also be seen in FIG. 5A). The runner 150 has a minimum radial thickness at the centre 155 of the segment and a maximum radial thickness at the outer regions 156, 157 of the runner 150. This variation in thickness enables the runner to have an arcuate (and part circumferential) sealing surface 152 on the rotor side and a substantially linear surface at the interface with the leaf seal 120, 130.

In a similar manner, the thickness of the support 140 has a radial thickness which varies circumferentially. The support 140 has a maximum radial thickness at the centre 145 of the segment and a minimum radial thickness at the outer regions 146, 147. This variation in thickness enables the segments of the support 140 to have an arcuate (and part circumferential) outer surface on the stator side (to engage/interface with the backing ring 142) and a substantially linear surface at the interface with the leaf seal 120, 130.

Thus, it will be appreciated that the segmented seal in accordance with embodiments enables the segments to utilise leaf seals 120, 130 which are acting between substantially parallel spaced apart linear surfaces of the runner 150 and support 140. This may simplify the geometry and dynamics of the leaf seals 120 and 130. The complete segmented seal assembly still provides an annular arrangement which can seal between a rotating and stationary member since the inner surface of the runner 150 and outer surface of the support 140 segments form circular circumferential boundaries of the seal. However, the leaf seals 120, 130 are effectively formed as a series of generally tangentially aligned extending members which form a polygonal rather than circular form.

FIG. 4 shows a cross section of the embodiment of FIG. 3. The general arrangement of the leaf seal in this embodiment corresponds to that of FIG. 2. It may be noted that the leaf seal 10' includes a cavity C. The cavity C is at least partially annular space extending around the leaf seal (the cavity could extend around the full seal or a separate cavity may be defined for each seal segment 110). The cavity C is bounded radially by the opposing surfaces of the support 40' and runner 50' and axially by the first 20' and second 30' leaf seals. In accordance with embodiments of the invention, the first (high pressure side) leaf seal 20' is vented such that the cavity C may be exposed to the high pressure HP as shown schematically by arrow V.

The venting of the cavity C with high pressure fluid from the high pressure side HP of the seal 10' enables operation pressure from the turbo-machine to act directly upon the rearward (non-sealing) surface of the runner 50'. This helps position the runner in the operative state and may enable a more compact reverse arrangement than prior art arrangements.

The skilled person will appreciate that the venting of the first leaf seal 20' may be achieved in a number of ways—for example by providing specific apertures through the leaf seal 20'. A particularly convenient arrangement for venting the seal when using a segmented arrangement is illustrated in FIG. 5.

Figure 5A:
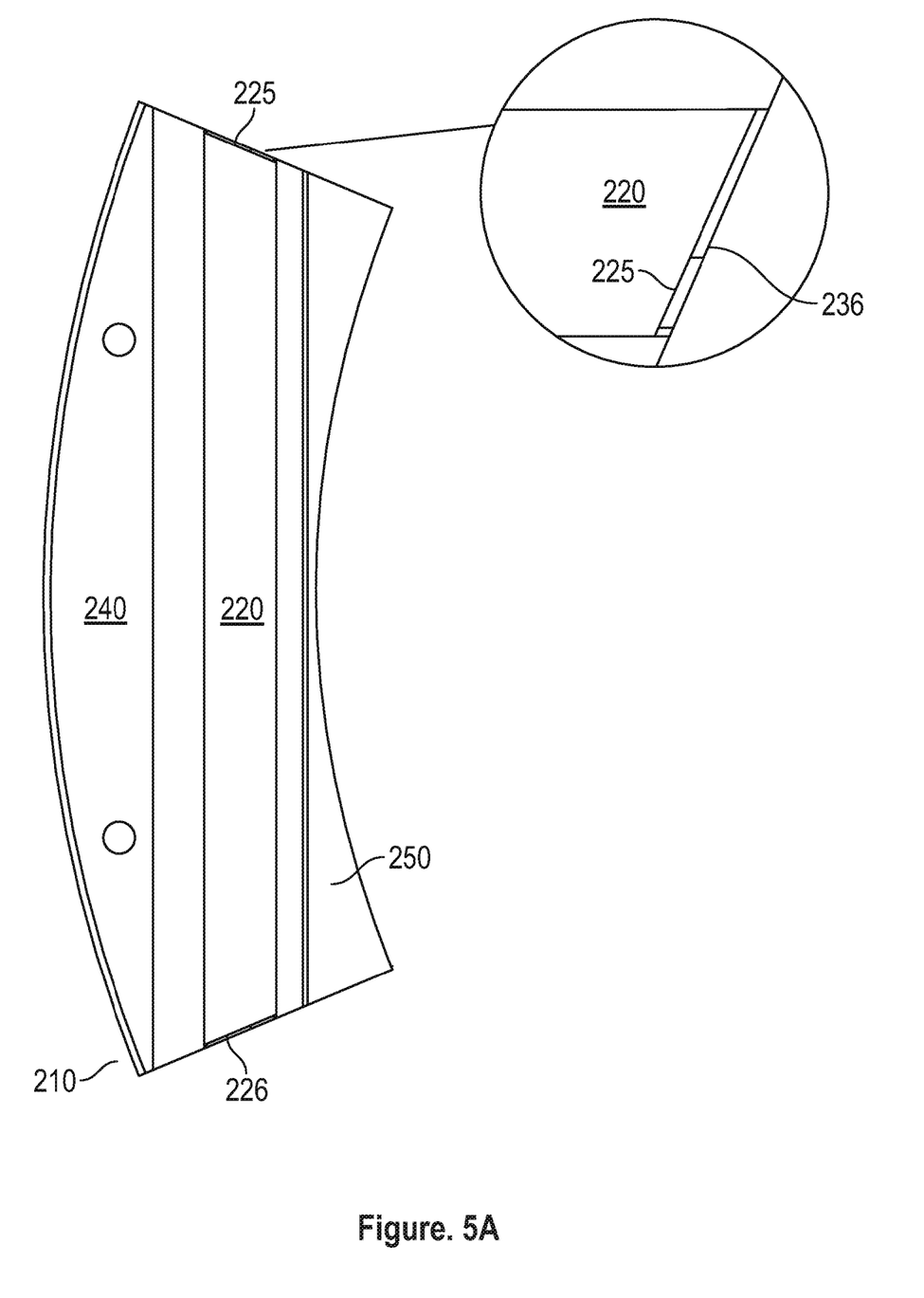
FIGS. 5A and 5B show a the segment interface of the leaf seal in accordance with the embodiment of FIGS. 3 and 4.

FIG. 5A shows a front view of a seal segment 210 which is substantially of the type described above. It may be noted that both outer circumferential edges 225 and 226 of the first leaf seal 220 have been relieved and as such do not extend fully to the end of the seal segment 220. In contrast the second leaf seals 230 extend fully to the end of the segment 220 such that their corresponding circumferential edges 235 and 236 can be seen axially behind the first leaf seal 210.

Figure 5B:
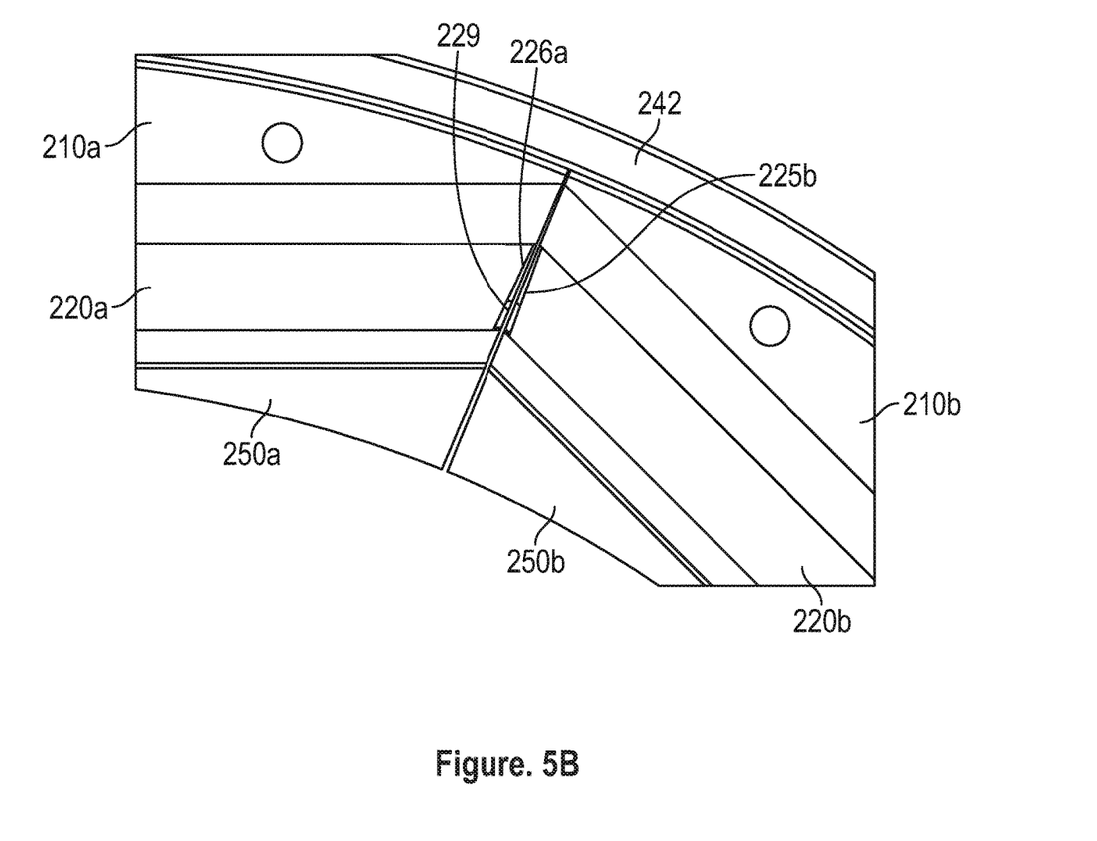

As seen in FIG. 5B, when adjacent seal segments 210a, 210b are assembled into a complete seal the relieved portions of the adjacent circumferential edges 225a and 226b form a vent slot 229. In contrast the spacing between other seal components (for example the runners 250a and 250b) is minimised such that there is substantially no leakage between the seal end sections.

Figure 6A:
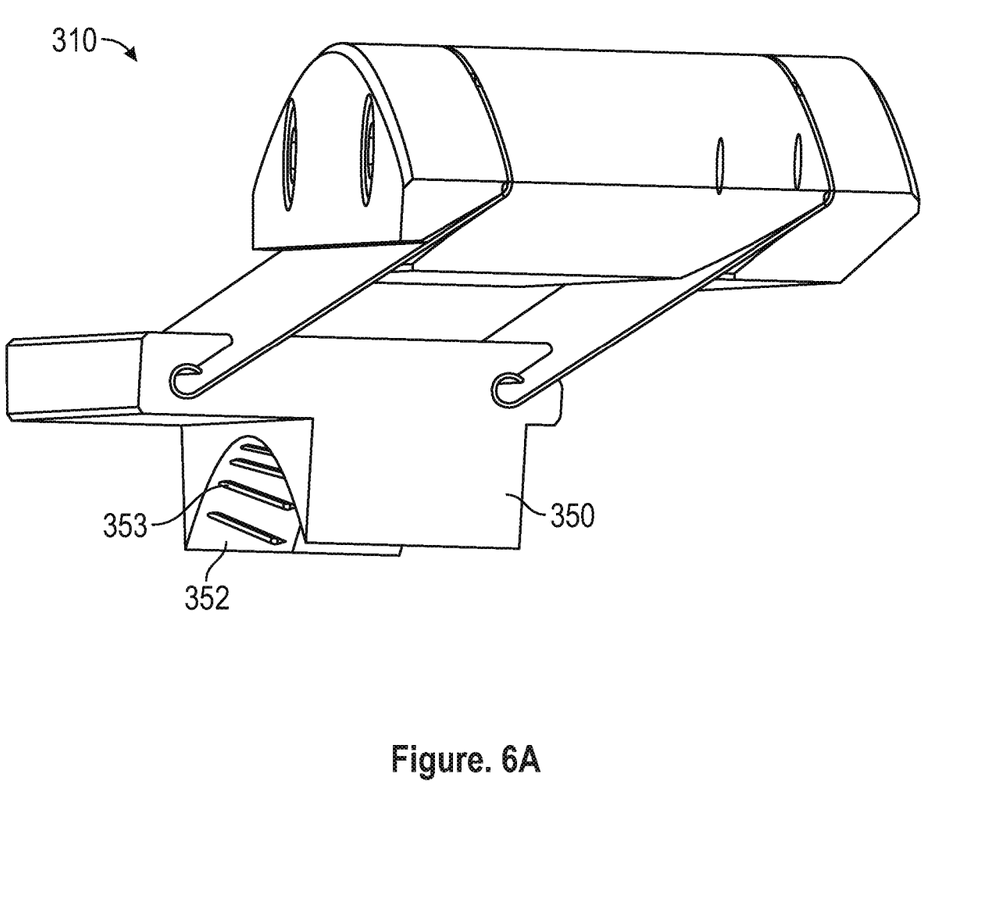
FIG. 6A to 6C show a segment of a leaf seal including flow control features on the sealing surface in accordance with a further embodiment.
Figure 6B:
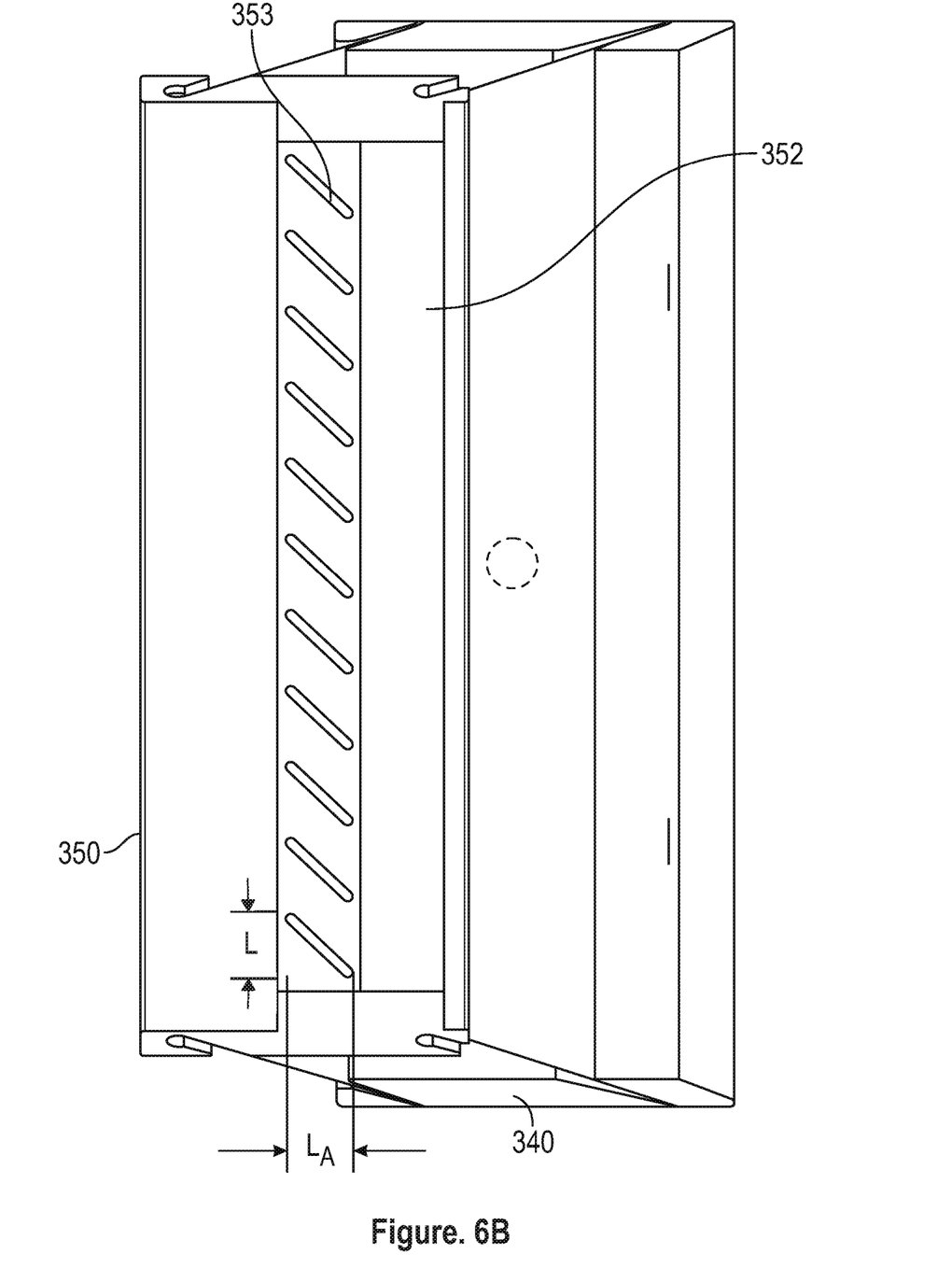
Figure 6C:
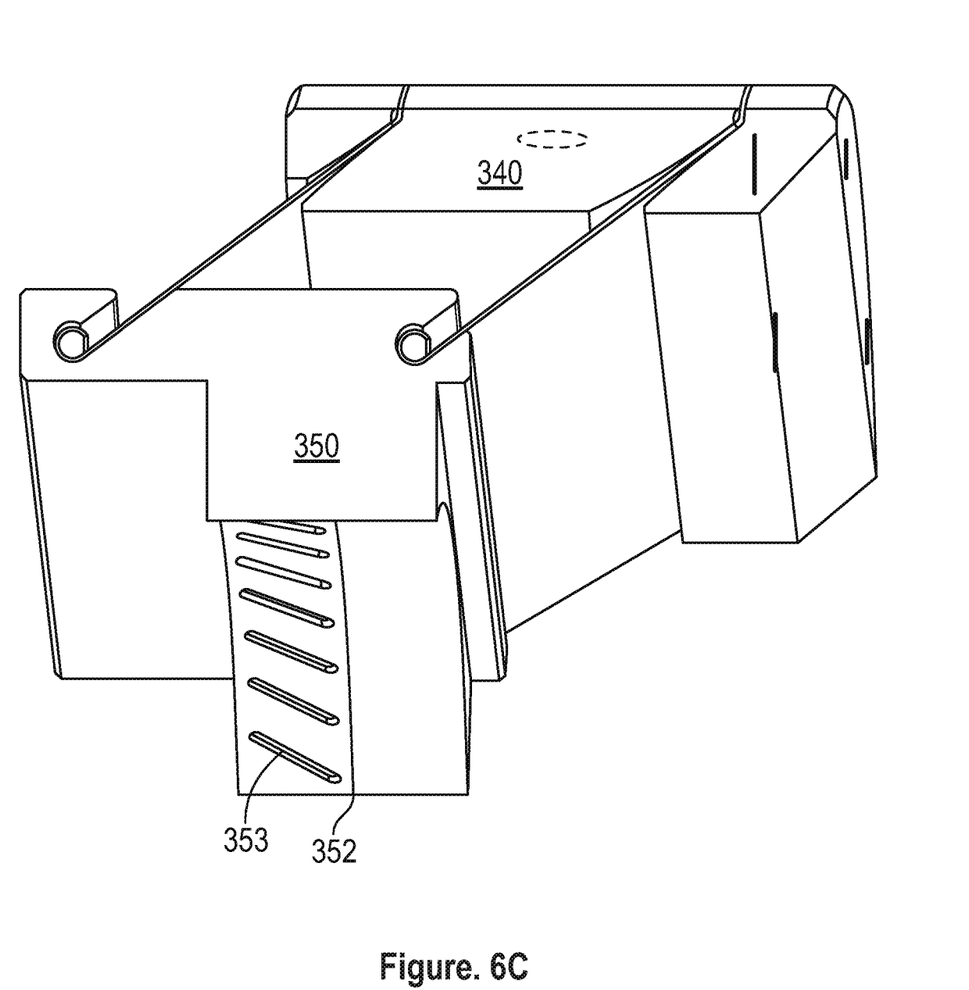

FIG. 6 shows a series of views of a seal segment 310 in accordance with a further embodiment of the invention. This embodiment is substantially similar to those described above but includes the addition of three-dimensional flow control features 353 on the sealing surface 352.

The three dimensional flow control features 353 are provided to optimise the film formed between the rotating body and runner during the operative state. For example the flow control features may be arranged to increase the film thickness. It will be appreciated that the particular flow control features utilised may depend upon the operational configuration of the seal (such as the intended flow conditions and the dimensions of the gap to be sealed). As such, the skilled person may optimise the flow control features for a particular application by normal optimisation. In the illustrated example the flow control features 353 comprise a series of slots formed in the sealing surface 352. The slots 353 are spaced circumferentially around the sealing surface of the seal segment. Each slot 353 is generally linear and extends along a length $L_A$ of the sealing surface in the axial direction of the seal assembly. As the slots are also inclined relative to the axial direction, they also extend along a length $L_C$ in the circumferential direction. The dimensions and geometry of the slots may be optimised for a particular application, for example the slots could be curved or have a variable angle. It will be appreciated that the orientation angle and/or length (in either direction) may depend upon the local flow conditions around the seal. For example whilst the fluid flow is generally axial in nature the rotating surface of the rotor 1 will provide a circumferential component to the flow within the film.

In addition to increasing film stiffness the flow control features may also help to reduce edge losses at the joins between separate segments of a segmented seal assembly (it will be appreciated that whilst losses at such joins may be minimised the seal must move during use and will be subject to manufacturing tolerances so small gaps between segments cannot be entirely avoided). As such the flow control features (for example the circumferential spacing between slots) may be optimisable across the circumferential length of the sealing surface, for example spacing proximal to the edges may be different to that toward the centre of a segment.

Although the invention has been described above with reference to preferred embodiments, it will be appreciated that various changes or modifications may be made without departing from the scope of the invention as defined in the appended claims.

The invention claimed is:

1. An assembly, comprising:
   a rotating component and a stationary component, wherein the rotating component is spaced apart from the stationary component defining a gap therebetween, and wherein fluid flows through the gap in an operative state; and
   a leaf seal assembly located within the gap, the leaf seal assembly comprising:
      a first leaf seal having a generally planar surface;
      a second leaf seal having a generally planar surface, and spaced apart along an axial direction of the gap from the first leaf seal, such that the first leaf seal is located axially upstream of the second leaf seal with respect to a direction of fluid flowing through the gap in the operative state;
      a support coupled to proximal ends of the first and second leaf seals configured to be located proximal to the stationary component, whereby the support fixedly connects the leaf seal assembly to the stationary component;
      a runner coupled to distal ends of the first and second leaf seals configured to be located proximal to the rotating component, the runner comprising a Rayleigh step at an axially upstream side of the runner such that the first and second leaf seals maintain the runner in a first position away from the rotating component in an unpressurised inoperative state and moves the runner to a second position, close to, but not contacting, the rotating component in the operative state, whereby the operative state is pressurised;
   wherein a cavity is defined by the first leaf seal, second leaf seal and runner and wherein the first leaf seal is vented such that the cavity is pressurised when the rotating component is in the pressurised operative state; and
   wherein the first and second leaf seals are angled in the direction of fluid flow through the gap in the operative state, such that the distal ends of the first and second leaf seals are arranged axially downstream from the proximal ends of the first and second leaf seals with respect to the direction of fluid flow through the gap in the operative state.

2. The assembly as claimed in claim 1, wherein the first and second leaf seals are inclined such that the distal ends extend axially rearwardly, along an axial direction of the assembly, towards a side of the leaf seal assembly that is exposed to low pressure when fluid flows in the gap in the operative state.

3. The assembly according to claim 1, wherein the first leaf seal is located at a side of the leaf seal assembly that is exposed to high pressure when fluid flows in the gap in the operative state, such that the cavity is vented to the high pressure side of the seal assembly in the operative state.

4. The assembly according to claim 1, wherein the first leaf seal includes one or more apertures which extend through a full axial thickness of the first leaf seal.

5. The assembly according to claim 1, wherein the leaf seal assembly is formed of a plurality of arcuate segments; wherein each segment comprises a section of the first leaf seal, a section of the second leaf seal, a section of the support and a section of the runner; and wherein venting of the first leaf seal is provided by a clearance gap between first leaf seal sections of adjacent segments.

6. The assembly as claimed in claim 5, wherein the first leaf seal section of each segment has a reduced arcuate length relative to the second leaf seal section of the same segment.

7. The assembly as claimed in claimed 5, wherein the runner section of each segment is provided with a radial thickness which varies circumferentially.

8. The assembly as claimed in claim 7, wherein the runner section of each segment has a minimum radial thickness at a centre of the runner section and a maximum radial thickness at outer regions of the runner section, the runner section of each segment having an arcuate sealing surface proximal to the rotating component and a substantially linear surface proximal to the first and second leaf seal sections.

9. The assembly as claimed in claim 8, wherein the support section of each segment has a radial thickness which varies circumferentially, such that the support section has a maximum radial thickness at a centre of the support section and a minimum radial thickness at outer regions of the support section, the support section of each segment having an arcuate outer surface proximal to the stationary component and a substantially linear surface proximal to the first and second leaf seal section.

10. The assembly as claimed in claim 9, wherein each segment comprises a plurality of first and second leaf seal sections acting between substantially parallel spaced apart linear surfaces of the runner section and support section.

11. The assembly according to claim 1, wherein the runner comprises a sealing surface which is configured to substantially correspond to a profile of the rotating component and wherein the sealing surface has at least one flow control feature.

12. The assembly as claimed in claim 11, wherein the at least one flow control feature comprises at least one rib or slot formed in the sealing surface.

13. The assembly as claimed in claim 12, wherein the flow control feature comprises a plurality of slots or ribs spaced circumferentially around the sealing surface.

14. The assembly as claimed in claim 13, wherein the, or each, slot or rib may extend along a length of the sealing surface in an axial direction of the seal assembly and is inclined relative to the axial direction.

15. A leaf seal assembly for use in a gap between a rotating component and a stationary component, the leaf seal assembly comprising:
   a plurality of circumferentially disposed arcuate segments, each segment comprising:
      a first leaf seal having a generally planar surface;
      a second leaf seal having a generally planar surface, and spaced apart along an axial direction of the gap from the first leaf seal, such that the first leaf seal is located upstream of the second leaf seal;
      a support coupled to proximal ends of the first and second leaf seals configured to be located proximal to the stationary component, whereby the support is configured to fixedly connect the leaf seal assembly to the stationary component;

a runner coupled to distal ends of the first and second leaf seals configured to be located proximal to the rotating component, such that the first and second leaf seals are capable of maintaining the runner in a first position away from the rotating component in an unpressurised inoperative state and capable of moving the runner to a second position, close to, but not contacting, the rotating component in a pressurised operative state; and wherein a cavity is defined by the first leaf seal, second leaf seal and runner, and wherein the first leaf seal is vented such that the cavity is pressurised when the rotating component is in the pressurised operative state, and wherein the first leaf seal of each segment has a reduced arcuate length relative to the second leaf seal of the same segment, such that venting of the first leaf seal is provided by a clearance gap between the first leaf seals of adjacent segments.

* * * * *